Figure 1:
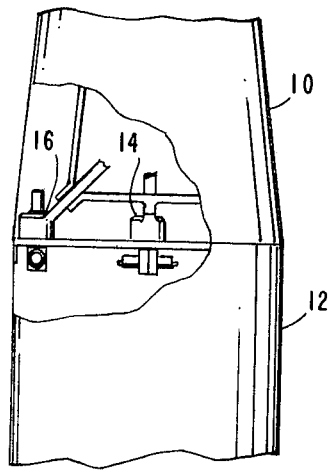

Nov. 14, 1967

JAMES E. WEBB
ADMINISTRATOR OF THE NATIONAL AERONAUTICS
AND SPACE ADMINISTRATION
SPLIT NUT SEPARATION SYSTEM 3,352,192

Filed Oct. 26, 1966

2 Sheets-Sheet 1

INVENTOR.
WILLIAM F. CARR
BY
ATTORNEY

INVENTOR.
WILLIAM F. CARR

United States Patent Office 3,352,192
Patented Nov. 14, 1967

3,352,192
SPLIT NUT SEPARATION SYSTEM
James E. Webb, Administrator of the National Aeronautics and Space Administration, with respect to an invention by William F. Carr, Santa Monica, Calif.
Filed Oct. 26, 1966, Ser. No. 590,147
7 Claims. (Cl. 85—33)

The invention described herein was made in the performance of work under a NASA contract and is subject to the provisions of Section 305 of the National Aeronautics and Space Act of 1958, Public Law 85–568 (72 Stat. 435; 42 USC 4257).

This invention relates to an improved device for releasably securing adjoining sections of objects to each other, and for automatically separating them when desired.

In the conduct of the present space exploration activity, it is usually desirable to jettison a rocket motor from its pay load after burn out. Also, in air launched sonabuoy systems two tandem connected cylindrical sections of sonabuoys ballistic casings are usually separated after immersion in the sea to form thereby an operational transmitter buoy and depending hydrofoam combination. It is desirable in either case, at the proper time to insure a prompt and certain separation. In the case of the outer space activity, it is desired not to fill the environment with debris or outgassing thus placing the requirement that none of the products or components which are broken in the separation leave either of the separating components.

Accordingly, an object of this invention is the provision of a novel construction for a separation system which couples two devices.

Yet another object of the present invention is the provision of a separation system for coupling two devices which has a very high order of reliability when actuated.

Still another object of the present invention is the provision of a separation system construction which avoids both explosive outgassing and loose debris when actuated.

These and other objects of the present invention may be achieved in an arrangement wherein the two parts which are joined together by the separation system are primarily held together by a bolt which is a part of the system, and is called a separation bolt. The bolt passes through two holes in the two components which are to be separably attached. The head end of the bolt holds one of the components and a split nut has threads therein, into which the threaded end of the bolt is screwed to hold the other component in proximity to the first component. In a space between the two components through which the separation bolt passes, there is provided a large spring which is in compression. This spring is called a separation spring and its function is to separate the two components and impart separation velocity when the separation bolt is no longer holding them together. A second compression spring termed a bolt ejection spring is attached to one of the components at one end and has its other end attached to the bolt. This spring throws the bolt in the direction of the bolt head when the split nut is separated and the bolt is let go. A cup covers the bolt and contains a mechanism to catch and hold the separation bolt when it is ejected by the bolt ejection spring.

The threaded portion of the bolt is held by a split nut, the two pieces of which are held together by a cross bolt. Two separation nuts are respectively mounted on the two halves of the split nut on opposite sides of the cross bolt. These may be actuated by an electrical signal which detonates an explosive within the separation nuts causing a plunger to move whereby the cross nut pieces are pushed apart to release the threaded end of the separation bolt. The bolt ejection spring can then act to throw the separation bolt out into its catcher. The separation spring can then push the two objects or components apart from one another. A second debris container encloses the split nut and the two separation nuts and catches the debris therefrom.

Figure 2:
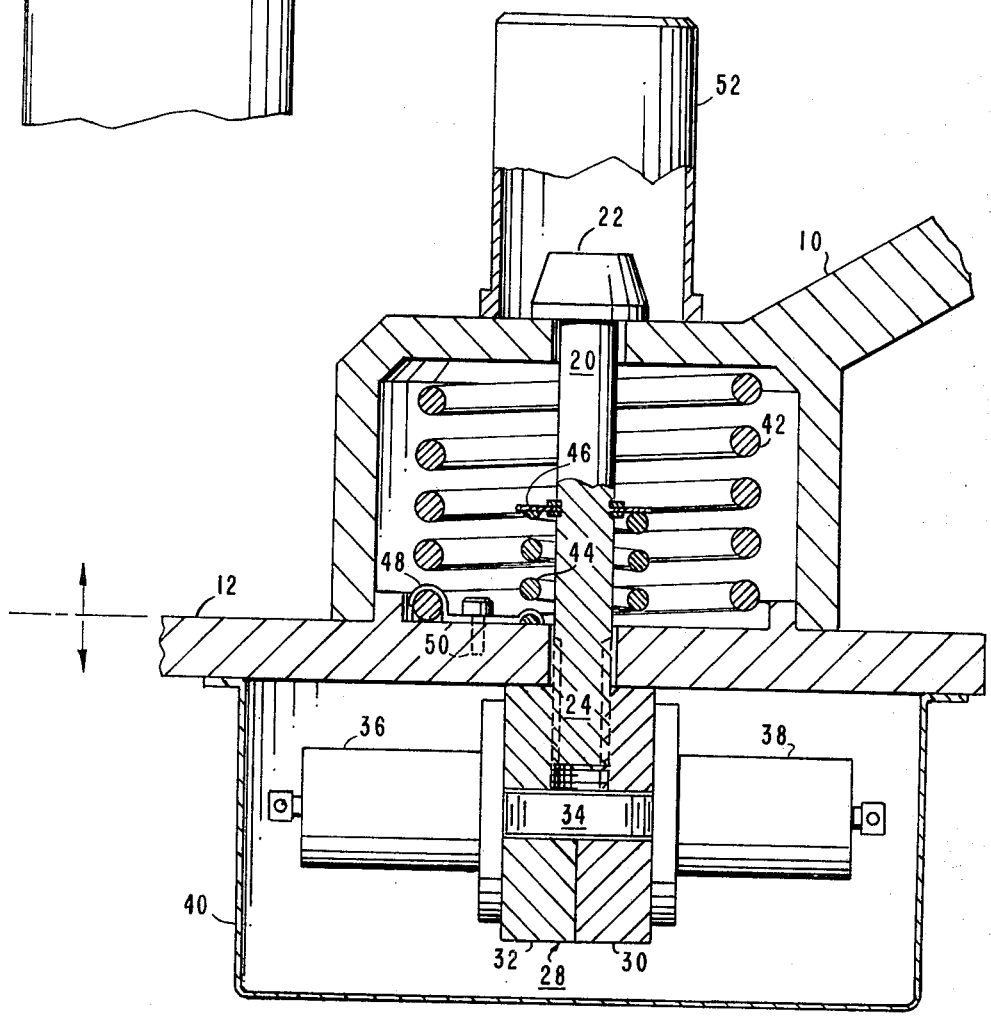
Figure 3:
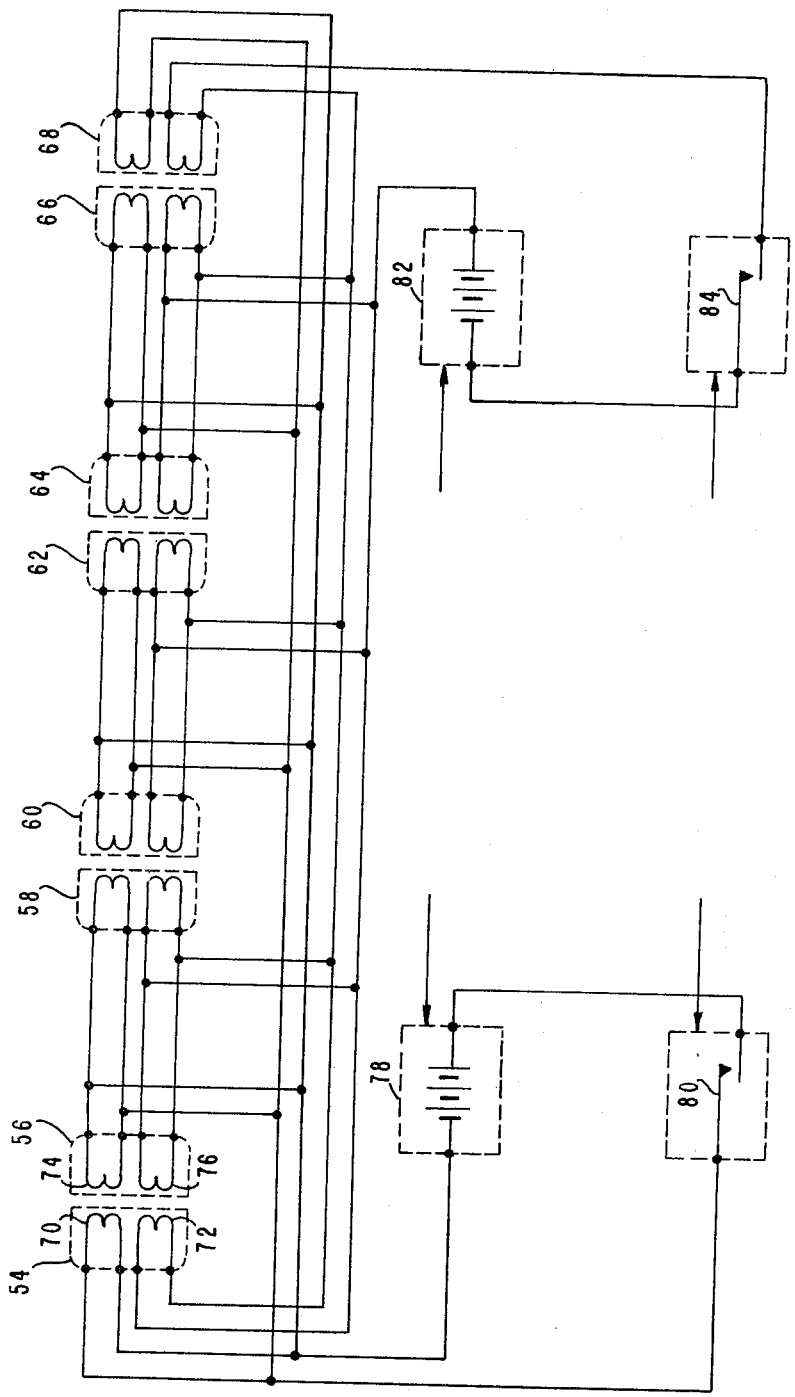

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a drawing of two portions of a hypothetical space vehicle which are releasably secured by a plurality of separation systems in accordance with this invention; and FIGURE 2 is an enlarged cross-sectional diagram showing a separation system in accordance with this invention; and FIGURE 3 is a firing schematic drawing for the separation system.

FIGURE 1 illustrates two adjoining portions of a space vehicle comprising for example a flight craft 10 and a launch vehicle 12. The two are held together by a plurality of separation devices, 14, 16, only two of which are indicated. However, it will be appreciated that a plurality of these separation devices are required spaced around the adjoining perimeters of the two components to be separated.

FIGURE 2 is an enlarged view in cross-section of one of the separation devices 14, 16, shown in FIGURE 1. The system includes a separation bolt 20, having a bolt head 22 at one end, and a threaded portion 24 at the other end. The separation bolt fits through two holes in the respective flight craft and launch vehicle perimeter. It holds these two objects together by being threaded into a split nut 28 the two halves of which respectively 30, 32 are held together by a cross bolt 34.

Mounted on the respective split nut halves 30, 32 are two separation nuts, respectively 36, 38. By way of example, these may be of the type known as the 7300 series, manufactured by Hi-Shear Corporation, of Torrance, Calif. These are preferably nonfragmenting and non-outgassing. This type, while preferable, is not to be construed as a limitation upon the invention since any separation nut may be employed here which is nonfragmenting and non-outgassing. The separation nut, and split nut assembly are all contained within a debris catcher container 40, which is attached to the launch vehicle and which prevents debris from being scattered upon separation.

In a space between the launch vehicle and the flight craft, through which the shank of the separation bolt passes, there are placed two compression springs. One of these which may be termed the separation spring 42, is held in compression between the two objects to be separated, and serves to push them apart when the separation bolt is released. The second spring 44, is termed a bolt ejection spring. This spring is compressed between the launch vehicle and a disc 46 attached by any suitable means to the shank of the separation bolt. A spring retainer 48, which is attached by a screw 50 to the launch vehicle adapter serves to hold one end of both springs to prevent them from being lost when the two portions separate.

FIGURE 3 is a firing schematic drawing for the separation system in accordance with this invention. On the assumption that four separation systems are used to separably attach two bodies, there are shown schematically eight separation nuts respectively 54, 56, 58, 60, 62, 64, 66, 68 which would be used. Two separation nuts are used for each separation system as shown in FIGURE 2. Each separation nut pair, 54, 56, has four bridge wires 70, 72, 74, 76, for example, electrical current through any one of which causes a detonation of a power cartridge not shown which separates the split nut halves. To insure separation, all the upper bridge wires, 70, 74 are connected in parallel to one power supply 78, which is in series with a switch 78. All the lower bridge wires are connected to another power supply 80, in series with a switch 84. The switches are usually remotely controlled.

The electrical system described insures that upon the closing of at least one switch, at least one of the bridge wires in a separation nut will receive current and will fire a cartridge which generates gas pressures within the separation nut which (referring to FIGURE 2), releases the cross bolt 34 in the split nut. A pressure plunger, also within the separation nut, is also released at this time which serves to drive the split nut apart. As a result, the separation bolt is released and under the force of the bolt ejection spring 44, is thrown upward into a bolt catcher cup 52, which is attached to the flight craft over the opening of the bolt. The debris caused by the detonation of the separation nuts is caught in the debris catcher 40. Under the urging of the separation spring 42, the two portions of the space vehicle are separated from one another at a velocity which can be established by the spring constants of the separation spring. The separation spring and bolt ejection spring are both retained by the spring retainer.

From the foregoing explanation it should be apparent that there has been descrbied and shown herein a novel, useful and reliable separation system for separably attaching two objects.

What is claimed is:

1. A separation system for attaching two objects together in a manner so that they can be separated comprising a separation bolt having a thread at one end, openings in said objects through which said bolt passes, a split nut comprising two halves having threads in opposite faces of said two halves for engaging the threads on said bolt, cross bolt means holding said two halves together, said separation bolt being threaded into the threads of said split nut for holding said two objects together, compression spring means for yieldably biasing said two objects apart against the restraining force of said separation bolt, and means for separating said split nut halves against the retaining force of said cross bolt means to release said separation bolt and to enable said separation spring to separate said two objects.

2. Apparatus as recited in claim 1 wherein said means for separating said split nut halves comprise a separation nut mounted on each of said split nut halves.

3. Apparatus as recited in claim 1 wherein there is included bolt ejection compression spring means compressed between one of said objects and said separation bolt for ejecting said bolt when said split nut halves are separated.

4. Apparatus as recited in claim 1 wherein there is included debris container means attached to said one of said objects and enclosing therein said separation nut means and said split nut.

5. Apparatus as recited in claim 3 wherein there is included bolt catcher container means for catching said bolt when it is ejected by said bolt ejection spring means.

6. Apparatus for releasably holding together two objects comprising a separation bolt having a thread on one end, holes in said two objects for enabling said bolt to be passed therethrough, split nut means including two nut halves having threads in opposite faces thereof for engaging the threads on the end of said separation bolt for holding said two objects together, cross bolt means threadably engaging said two split nut halves for holding them together for retaining the threaded end of said separation bolt, separation nut means mounted on said split nut for forcing said split nut halves apart when actuated, a container, means for supporting said container for enclosing said separation nut means and said split nut, separation spring means mounted between said two objects for separating said two objects when said separation bolt is ejected, bolt ejection spring means mounted for rejecting said separation bolt when said split nut is separated into two parts, and bolt catcher container means mounted over the head end of said bolt for catching said bolt when it is ejected.

7. Apparatus as recited in claim 6 wherein there is included means for retaining one end of said separation spring means and said bolt ejection spring means attached to one of said objects.

References Cited

UNITED STATES PATENTS

| | | |
|---|---|---|
| 2,421,807 | 6/1947 | Richey et al. |
| 2,858,726 | 11/1958 | Robinson et al. |
| 2,871,750 | 2/1959 | Parrish. |
| 2,937,595 | 5/1960 | Margulis et al. |
| 2,984,144 | 5/1961 | Erdmann _____ 85—33 |
| 3,094,928 | 6/1963 | Costley et al. _____ 89—1.01 |
| 3,114,962 | 12/1963 | Brown. |
| 3,140,886 | 7/1964 | Cotilla et al. _____ 89—1.01 |
| 3,147,663 | 9/1964 | Brown. |
| 3,180,389 | 4/1965 | Frank _____ 151—69 |
| 3,299,767 | 1/1967 | Royer. |

MARION PARSONS, JR., *Primary Examiner.*